(12) United States Patent
Wechsler et al.

(10) Patent No.: US 8,769,621 B2
(45) Date of Patent: Jul. 1, 2014

(54) METHOD AND SYSTEM FOR PROVIDING PERMISSION-BASED ACCESS TO SENSITIVE INFORMATION

(75) Inventors: Chesla Catherine Wechsler, Shrewsbury, NJ (US); Gerald Maziarski, Toms River, NJ (US); Earle H. West, Marlboro Township, NJ (US); Amy Susan Miller, Blaine, MN (US); John Arthur Feaver, Oakhurst, NJ (US); David Chen, Fremont, CA (US); Amir Mehmood Sheikh, Alpharetta, GA (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 166 days.

(21) Appl. No.: 13/008,497

(22) Filed: Jan. 18, 2011

(65) Prior Publication Data
US 2012/0185921 A1 Jul. 19, 2012

(51) Int. Cl.
*G06F 21/00* (2013.01)
*G06F 21/62* (2013.01)
*H04L 29/06* (2006.01)

(52) U.S. Cl.
CPC .......... *G06F 21/6245* (2013.01); *H04L 63/08* (2013.01); *H04L 63/102* (2013.01)
USPC .......................................................... 726/4

(58) Field of Classification Search
USPC .......................................................... 726/4
See application file for complete search history.

(56) References Cited

U.S. PATENT DOCUMENTS

| | | | |
|---|---|---|---|
| 5,841,116 A * | 11/1998 | Lewis ............................. | 235/375 |
| 6,269,369 B1 * | 7/2001 | Robertson ....................... | 707/10 |
| 6,601,092 B2 | 7/2003 | Itabashi et al. | |
| 6,754,665 B1 * | 6/2004 | Futagami et al. .............. | 707/102 |
| 7,302,467 B2 | 11/2007 | Matsuda et al. | |
| 7,797,421 B1 * | 9/2010 | Scofield et al. ................ | 709/224 |
| 7,912,971 B1 * | 3/2011 | Dunn ............................. | 709/229 |
| 7,926,087 B1 | 4/2011 | Holl, II et al. | |
| 2002/0082905 A1 | 6/2002 | Matsuda et al. | |
| 2003/0194070 A1 * | 10/2003 | Shibasaki et al. ......... | 379/114.01 |
| 2004/0093334 A1 * | 5/2004 | Scherer .............................. | 707/8 |
| 2004/0098366 A1 | 5/2004 | Sinclair et al. | |
| 2007/0204329 A1 | 8/2007 | Peckover | |
| 2008/0040799 A1 | 2/2008 | Matsuda et al. | |
| 2008/0155025 A1 * | 6/2008 | Xu et al. ........................ | 709/206 |
| 2008/0229396 A1 * | 9/2008 | Bodepudi et al. ................ | 726/4 |
| 2009/0006124 A1 | 1/2009 | Sinclair et al. | |
| 2010/0005520 A1 * | 1/2010 | Abbot et al. ...................... | 726/6 |
| 2010/0229214 A1 | 9/2010 | Zhu et al. | |
| 2010/0332997 A1 * | 12/2010 | Hamilton et al. ............. | 715/757 |

* cited by examiner

*Primary Examiner* — Jason K. Gee
*Assistant Examiner* — Maung Lwin
(74) *Attorney, Agent, or Firm* — Greenblum & Bernstein, P.L.C.

(57) ABSTRACT

A method provides for permission-based access to personal information over a communication network. The method includes entering specified owner personal information in an owner terminal, by an owner, to establish a secure owner profile, which is stored in an owner database. The method also includes entering specified user personal information in a user terminal, by a user, to establish a secure user profile, which is stored in a user database. The method further includes entering a user request in the user terminal requesting permission to receive a designated piece of the owner personal information from the secure owner profile. A server determines whether to approve the user request; and provides permission to use the designated piece of the owner personal information to the user over the communication network after the user request is approved by the server.

18 Claims, 5 Drawing Sheets

METHOD AND SYSTEM FOR PROVIDING PERMISSION-BASED ACCESS TO SENSITIVE INFORMATION

BACKGROUND

1. Field of the Disclosure

The present disclosure relates to the field of communications. More particularly, the present disclosure relates to providing permission-based access to sensitive personal information over a communication network.

2. Background Information

Traditionally, information access systems provide sensitive personal information to users of the access system without the knowledge of the owner of the sensitive personal information. Thus, certain sensitive personal information is provided to users of the access system that an owner would have preferred not been provided to users. The question of whether personal information being provided is owned by the person providing the personal information is also a factor.

DETAILED DESCRIPTION

In view of the foregoing, the present disclosure, through one or more of its various aspects, embodiments and/or specific features or sub-components, is thus intended to bring out one or more of the advantages as specifically noted below. According to an embodiment of the present disclosure, a method provides for permission-based access to personal information over a communication network. The method includes entering specified owner personal information in an owner terminal, by an owner, to establish a secure owner profile, and storing the secure owner profile in an owner database. The method also includes entering specified user personal information in a user terminal, by a user, to establish a secure user profile, and storing the secure user profile in a user database. The method further includes entering a user request in the user terminal requesting permission to receive or use a designated piece of the owner personal information from the secure owner profile. The method includes determining, by a server, whether to approve the user request, and thus providing permission to use the designated piece of the owner personal information to the user over the communication network after the user request if approved by the server.

In another embodiment, the secure owner profile includes the owner's name, owner profile identifier, sensitive personal information, a list of trusted users, and an alert configuration.

In an embodiment, the secure owner profile is associated with or linked to personal information, such as content and/or services owned by the owner that also needs permission-based access.

In a further embodiment, the list of trusted users includes a global list of trusted users whose user requests are automatically approved, and a specific list of trusted users whose user requests are approved only for selected pieces of the owner's personal information, designated by the owner.

In an embodiment, the owner can update the specified owner personal information stored in the secure owner profile over the communication network using the user terminal.

In another embodiment, the secure user profile includes the user's name and user profile identifier.

In a further embodiment, all user requests and related approval determinations are stored in an historical database establishing an historical record.

In an embodiment, the user request includes a piece of owner personal information that is used by the server to determine whether to approve the user request, such that the server provides (1) a response indicating that the owner is not a subscriber when the piece of owner personal information does not match any owner stored in any owner database, (2) a response automatically approving the user request when the user is included in a global list of trusted users, and (3) a response conditionally approving the user request when the user is included in a specific list of trusted users, dependent upon the user and the designated portion of owner personal information requested.

In another embodiment, the determining whether to approve the user request by the server includes sending an alert notification to the owner that a user request has been received, and receiving from the owner an owner response indicating whether the user request should be approved.

In a further embodiment, the alert notification includes specific information designated by the owner in the secure owner profile.

In an embodiment, the server waits a designated amount of time for the owner response to the alert notification, the designated amount of time being specified in the secure owner profile, and the server provides an owner default response to the user request when the owner response is not received within the designated amount of time.

In another embodiment, the owner may access all pending user requests, and selectively determine whether to approve each pending request.

In a further embodiment, the owner must enter both a permanent owner identifier and a transitory security identifier to access the pending user requests.

In an embodiment, when the owner selects a special lock-down provision, the server continues to receive user requests from a designated user, but is prevented from approving any user requests from the designated user, and when the owner selects a global lockdown provision, the server continues to receive user requests from all users, but is prevented from approving user requests from any user.

In another embodiment, the server provides a special warning message to the owner when at least one designated user request attribute exceeds an owner-established user request threshold.

In a further embodiment, the at least one designated user request attribute includes a total number of user requests within a timeframe established by the owner.

In an embodiment, the at least one designated user request attribute further includes a total number of user requests for a same piece designated portion of owner personal information.

In another embodiment, the originating source stores the System ID and Profile ID of the owner, and when sent the selected piece of specified owner personal information provided by the originating source, returns the System ID and Profile ID.

In a further embodiment, the user may query the permission-based personal information access system using the user terminal to check the status of user requests.

In an embodiment, a non-transitory computer-readable storage medium is encoded with a computer-executable program for providing permission-based access to personal information. The storage medium includes an owner entering segment for entering specified owner personal information in an owner terminal, by an owner, to establish a secure owner profile, and an owner storing segment for storing the secure owner profile in an owner database. The storage medium also includes a user entering segment for entering specified user personal information in a user terminal, by a user, to establish a secure user profile, and a user storing segment for storing the secure user profile in a user database. The storage segment further includes a user entering segment for entering a user request in the user terminal requesting permission to receive a designated piece of the owner personal information from the secure owner profile, a determining segment for determining, by a server, whether to approve the user request, and a providing segment for providing access to the designated piece of the owner personal information to the user over the communication network after the user request is approved by the server.

In another embodiment, a system provides for permission-based access to personal information over a communication network. The system includes an electronic owner database that stores at least one secure owner profile, the at least one secure owner profile including specified owner personal information, which was entered into the system by an owner terminal. The system also includes an electronic user database that stores at least one secure user profile, the at least one secure user profile including specified user personal information, which was entered into the system by a user terminal. The system further includes a server that receives at least one user request entered into the system by the user terminal, the at least one user request requesting permission to use or receive a designated piece of owner personal information from the secure owner profile, wherein the server provides permission to use, or permission to access, the designated piece of the owner personal information to the user over the communication network after the user request has been approved by the server.

Figure 1:
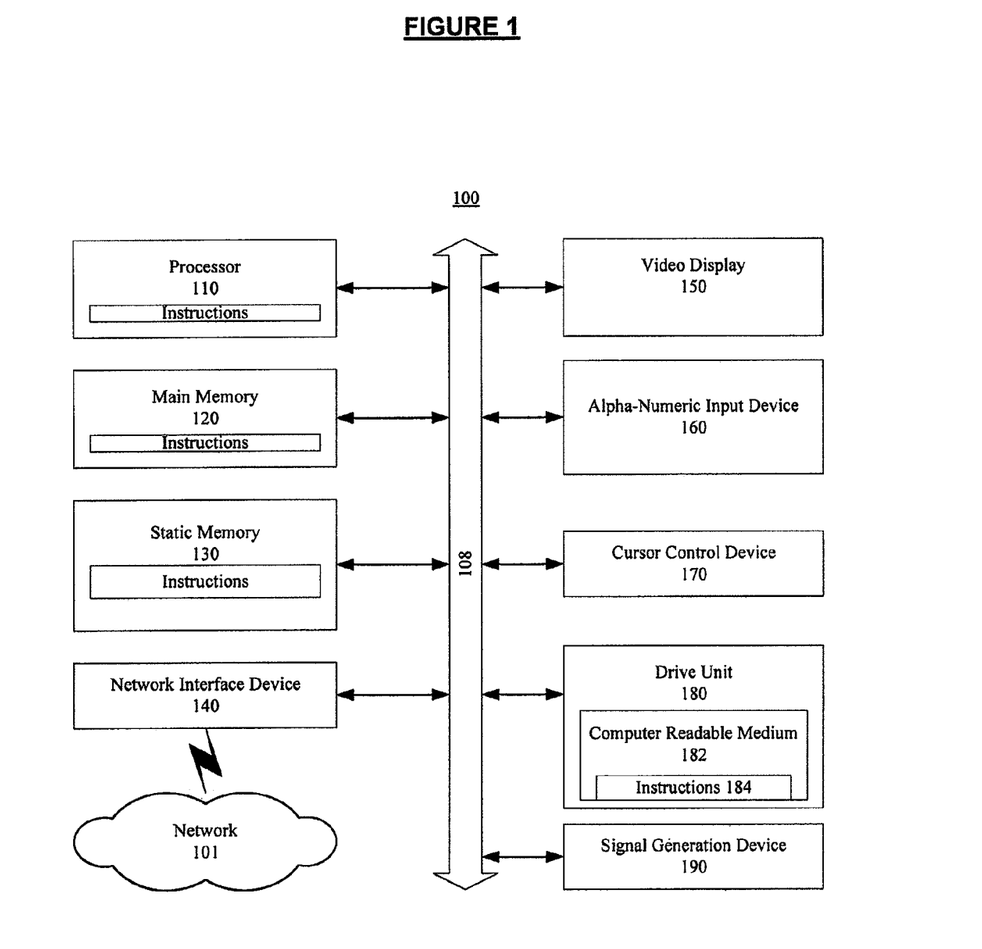
FIG. 1 shows an exemplary general computer system.

FIG. 1 is an illustrative embodiment of a general computer system, on which a method for providing permission-based access to sensitive personal information can be implemented, which is shown and is designated 100. The computer system 100 can include a set of instructions that can be executed to cause the computer system 100 to perform any one or more of the methods or computer based functions disclosed herein. The computer system 100 may operate as a standalone device or may be connected, for example, using a network 101, to other computer systems or peripheral devices.

In a networked deployment, the computer system may operate in the capacity of a server or as a client user computer in a server-client user network environment, or as a peer computer system in a peer-to-peer (or distributed) network environment. The computer system 100 can also be implemented as or incorporated into various devices, such as a personal computer (PC), a tablet PC, a set-top box (STB), a personal digital assistant (PDA), a mobile device, a global positioning satellite (GPS) device, a palmtop computer, a laptop computer, a desktop computer, a communications device, a wireless telephone, a land-line telephone, a control system, a camera, a scanner, a facsimile machine, a printer, a pager, a personal trusted device, a web appliance, a network router, switch or bridge, or any other machine capable of executing a set of instructions (sequential or otherwise) that specify actions to be taken by that machine. In a particular embodiment, the computer system 100 can be implemented using electronic devices that provide voice, video or data communication. Further, while a single computer system 100 is illustrated, the term "system" shall also be taken to include any collection of systems or sub-systems that individually or jointly execute a set, or multiple sets, of instructions to perform one or more computer functions.

As illustrated in FIG. 1, the computer system 100 may include a processor 110, for example, a central processing unit (CPU), a graphics processing unit (GPU), or both. Moreover, the computer system 100 can include a main memory 120 and a static memory 130 that can communicate with each other via a bus 108. As shown, the computer system 100 may further include a video display unit 150, such as a liquid crystal display (LCD), an organic light emitting diode (OLED), a flat panel display, a solid state display, or a cathode ray tube (CRT). Additionally, the computer system 100 may include an input device 160, such as a keyboard, and a cursor control device 170, such as a mouse. The computer system 100 can also include a disk drive unit 180, a signal generation device 190, such as a speaker or remote control, and a network interface device 140.

In a particular embodiment, as depicted in FIG. 1, the disk drive unit 180 may include a computer-readable medium 182 in which one or more sets of instructions 184, e.g. software, can be embedded. A computer-readable medium 182 is a tangible article of manufacture, from which sets of instructions 184 can be read. Further, the instructions 184 may embody one or more of the methods or logic as described herein. In a particular embodiment, the instructions 184 may reside completely, or at least partially, within the main memory 120, the static memory 130, and/or within the processor 110 during execution by the computer system 100. The main memory 120 and the processor 110 also may include computer-readable media.

In an alternative embodiment, dedicated hardware implementations, such as application specific integrated circuits, programmable logic arrays and other hardware devices, can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

In accordance with various embodiments of the present disclosure, the methods described herein may be implemented by software programs executable by a computer system. Further, in an exemplary, non-limited embodiment, implementations can include distributed processing, component/object distributed processing, and parallel processing. Alternatively, virtual computer system processing can be constructed to implement one or more of the methods or functionality as described herein.

The present disclosure contemplates a computer-readable medium 182 that includes instructions 184 or receives and executes instructions 184 responsive to a propagated signal, so that a device connected to a network 101 can communicate voice, video or data over the network 101. Further, the instructions 184 may be transmitted or received over the network 101 via the network interface device 140.

In providing permission-based access to sensitive personal information, permission for the requested sensitive personal information generally requires an acknowledgement from the owner of the information. Such a system is contrasted, for instance, from an alert system that merely provides an alert that someone is using your sensitive information. An example of an alert system would be a credit monitoring service that provides a person with an alert when some event detrimental to the person's credit rating has occurred. The permission-based access system not only informs an owner user when an owner's sensitive personal information is being requested, but actively requests the owner to approve or disapprove the usage of the owner's information by a particular user. The permission-based access system also monitors and records user requests for the owner's sensitive personal information, thereby establishing an historical record for future reference and analysis.

In the present disclosure, sensitive personal information (SPI), which may include information relating to digital rights, content, and services, generally refers to information specific to an individual, i.e., an owner of the sensitive personal information.

An owner is generally a person who has proven to be who they claim to be, and has ownership of the owner's sensitive personal information.

A user is generally a person who is requesting permission for at least one piece of sensitive personal information belonging to an owner.

A unique profile identifier, or profile ID, is generally the invariant key to any profile, either by an owner or a user, based on a unique user identity, or some other form of globally unique identifier. The unique profile identifier could also be a public key.

A system ID is generally an ID that uniquely identifies a particular instance of the use of the permission-based access system. This allows more than one provider to provide such a system, while ensuring that the combination of system ID and profile ID is unique to an individual.

Source of truth generally refers to an entity that maps one or more pieces of sensitive personal information to the system ID and the profile ID, and thus stands behind the validity of the relationship between the sensitive personal information and the system ID and profile ID. The source of truth may be an implementer of the system, or could be any agency or agencies that validate that a piece of sensitive personal information belongs to an individual. An example of a source of truth would be a state's division of motor vehicles that issues drivers' licenses.

An alert generally refers to a notification informing the owner or user that there is information waiting for them.

An alert configuration generally refers to the mapping of alert targets, e.g., real data, to alert names, e.g., labels. Examples of alert targets would include a telephone number, or an email address. Examples of alert names would include: home phone, mobile phone, mobile 1, text 1, email 1, etc.

A request password generally refers to a password entered by the user when making a request. The user used the request password together with a request identifier (request ID) provided by the system for each request, when checking the status of the request and a corresponding response to the request.

The request identifier (request ID) generally refers to a unique ID assigned to a permission request.

A system user generally refers to a system to system interface that can be validated by the system provider to be authenticated. For instance, a credit rating agency may have a client side certificate known to AT&T, and thus be able to send requests for permission through an automated system.

An enterprise account generally refers to a large corporation or other large entity that has many users that are linked to the corporation or entity. An enterprise account may also be regarded as a mega-user.

From the standpoint of authentication, a two-factor authentication mechanism is generally preferred, in order to discourage fraudulent use of the system. Identity management systems provide high assurance access control and privacy management of the user profile system. To prevent identity fraud, users' access to secure data should be required to use multi-factor authentication credentials, such as hardware tokens, one-time passwords, and biometric credentials (e.g., voice signature, fingerprint, eye scan, etc.) Mutual authentication must be enforced between the request application and the identity management system. The identity management system will support an application authentication/authorization model for user request and/or consent management. The identity management system also supports XACML standard based entitlement and privacy management functions. An exemplary system would include the use of a one-time password token with a PIN.

In a sensitive personal information permission-based access system, an Owner establishes a secure unique owner profile. The owner profile would generally include a designated combination or sub-combination of the following information: (a) a profile ID, (b) an alert configuration, (c) a time zone designation (for the purpose of displaying alert timestamps in local time), (d) sensitive personal information, (e) one or more alert names to send an alert notification to for each piece of sensitive personal information (an additional option would be to select all designated alert names), (f) a global default timeout (the default amount of time to wait between a request and an owner interaction with that request before applying any default behavior), (g) a global default behavior (such as to deny after a global default timeout if the owner has not otherwise disposed of the request), (h) a specific default behavior per piece of sensitive personal information (which would override the global default behavior), (i) a specific default timeout per piece of sensitive personal information (which would override the global default timeout), (j) a global list of trusted users (whose requests are automatically accepted), (k) a specific list of trusted users per piece of sensitive personal information (which would override the global list of trusted users), and (l) a security mechanism that guarantees that the identity of the owner (such as a private key in a public/private key pair, biometric information, a key fob and PIN, etc.).

The system also provides a secure interface for the owner to establish and maintain the information described above. Additionally, the system stores the secure unique profile for each owner in a manner that can be queried using sensitive personal information as the key.

Alternatively, the system ID and the profile ID are stored with the source of truth, and the source of truth provides a mechanism to return the system ID and profile ID when a system provides the pertinent piece of sensitive personal information. For example, given a driver's license number by the system, the division of motor vehicles returns the system ID and profile ID that is associated with that driver's license number.

A user also establishes a secure unique user profile. The user profile would generally include a designated combination or sub-combination of the following information: (a) profile ID, (b) an alert configuration, (c) a time zone designation (to display an alert notification in the local time), (d) a user name, (e) a business name, and an enterprise account identifier (which would link the user to a larger entity to which the user is associated).

The system stores the secure unique profile for each user in a manner that can be queried by the profile ID. The system also provides for the permanent storage of the user profiles so that the user profiles can be correlated with the various requests. An owner can also review an historical record of all requests and associated responses, whether the requests were answered by the owner or were automatically answered.

In general, the system may be accessed by any mechanism that can be secured with identity management. Examples would include a secure web page, a secure smart phone application, etc. A user would log into the system using their authentication mechanism, which is mapped to the user's Profile ID.

The user would select the provided option to request permission for access to sensitive owner personal information. The user would indicate the owner personal information of interest, provide the information that the user has for the owner personal information, provide the name that the user associates with the owner personal information (e.g., a job applicant's name), and provide a request password that needs to be entered later to read the response to the request. The user then submits the request to the system.

In response, the system provides the user with a unique request identifier (request ID). The system stores the request ID together with the profile ID of the user, the user's name, the user's business name, the date/time stamp, the sensitive owner personal information for which permission is being requested, the name associated with the owner personal information, and the request password.

The system uses the sensitive personal information as a key to access designated owner personal information in an owner database. If the sensitive personal information does not match any owner, the system creates a response indicating that the owner of that information is not subscribed to any system.

If the sensitive personal information does match an owner, and the owner has specified that the requesting user is trusted for that piece of information, then the request is automatically approved and a response is formulated by the system granting permission by the requesting user to access the requested piece of information.

On the other hand, if the owner has not specified that the requesting user is trusted for that piece of information, then the system sends the appropriate alert to that owner based on the settings in the owner's profile. For example, an alert could be formulated as follows: "Oct. 12, 2010, 4:34 PM, Request ID 492384: Bill Smith (bsmith) of Smith's Landscaping requests permission to use the following pieces of data [Social Security Number, Driver's License Number] in the name of John Doe. You have until Oct. 14, 2010, 4:34 PM to actively approve or deny this request. If you do not take a specific action, your default action of "Deny" will be sent." The alert would be sent to the owner in whatever manner the owner configured. It is noted that sensitive personal information would never be sent in an alert notification.

Upon receiving an alert notification, the owner has the amount of time left in the timeout to actively provide an answer. The owner can log into the system and see the pending requests. The owner can actively approve or deny any or all of the pending requests. The owner could also set the status of a pending request to "pending". If the timeout expires before the alert notification is acted upon by the owner, then the default behavior for that piece of personal information and/or that particular requester is used to formulate a response.

The response sent from the owner may incorporate the use of the optional security mechanism. For example, when providing approval, denial, or pending, the owner must enter the owner's PIN, as well as the changing set of digits on the key fob (the one-time password). The system verifies the information to ensure that the owner (possessor of the key fob and PIN) is in fact providing the response.

An alert notification is then sent to the user including the request ID, indicating that there is an answer to the user's request. For example, the user may receive "Oct. 12, 2010, 5:57 PM, Request ID 492484 has been answered". The user then logs in to see the result of the request, using the request ID and the request password.

Additional exemplary features of the system would include permitting the users to see the history of their requests and the corresponding responses to their requests. Additionally, owners could also be permitted to see the history of requests and the corresponding responses for their sensitive personal information.

The system may also include "lockdown" capabilities, which owners may execute at their own discretion, or have executed automatically by setting thresholds on selected events. Lockdown could be used, for example, to handle denial of service requests.

One lockdown provision will deny all subsequent requests immediately and automatically, although the owner will still receive notification of these requests, when the requests were made, and by whom the requests were made. Renewal cannot be automatic. Owners are advised of renewals "Y-days" before expiration of the lockdown.

Another lockdown provision will persist for "X-days" and then is automatically removed, unless the owner manually renews them. Renewal cannot be automatic. Owners are advised of renewals "Y-days" before expiration of the lockdown.

Additionally, existing lockdowns may be revoked by the owner at any time.

Further, the requesting user is optionally warned of the lockdown in the user's history of requests. The owner can "opt-in" or "opt-out" of either a supplied "red-flag" warning text, an owner-customized text, or no text or warning to the user.

The owner also has an option to supply a state of "Pending" in response to a request, in order for the owner to clarify a suspicious looking request.

Optionally, the owner may choose to add a preset note such as a "please call me at (telephone number) before taking further action in this regard" flag to the response to the user. In another option, the owner may create a customized text to flag the response.

The owner may also choose to contact the user through some other means, and add a note such as a "will be in contact with you" flag to the response.

A pending state generally restarts the clock related to the automatic handing of the user request. The pending state can also be optionally renewed.

The system may have a global default on the total number of times a pending state can be renewed. Additionally, pending may be changed to denial by the owner at any time during the duration of the pending state. Pending may also be changed to approved by the owner at any time during the duration of the Pending state. A pending state that has reached the expiration point is automatically converted into the preconfigured default response. Initial and final states of pending can be included in the owner's and user's histories.

Furthermore, the system includes auditing capabilities. Some of these capabilities would include auditing and determining when: (1) there are too many requests from a single user for a given timeframe, (2) there are too many denials back to a single user in a given timeframe, (3) there are too many requests requesting permission for the same piece of owner information in a give timeframe, and (4) there are too many uses of the same user alert information in different user profiles, e.g., a mobile number that has exceeded a threshold for receiving user alert notifications. Also, the system could audit that a piece of information designate to be unique to an individual, such as a Social Security Number, is only configured in one active owner profile.

The system can also be used to offer some sort of "gold star" rating to a user or to an enterprise account. For instance, for a designated employer, all of the employees may have been checked and verified. With regard to a bank, for instance, an account may not be opened without the person being checked.

The system may optionally pre-validate a number of system users (e.g., credit agencies, government agencies, banks, etc.) in order to offer the owners a set of trusted users that are available as part of the system.

Figure 2A:
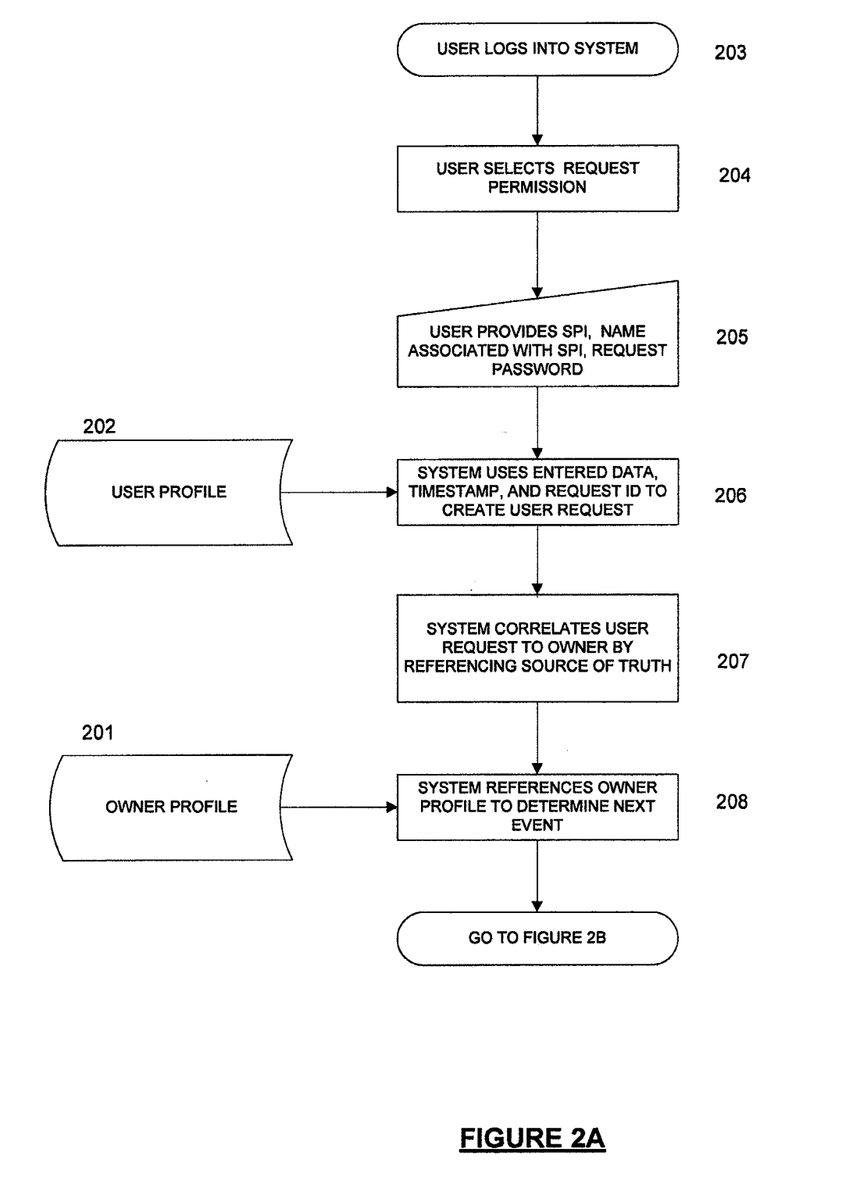
FIGS. 2A, 2B, and 2C provide a flowchart illustrating an exemplary embodiment of the permission-based access process.
Figure 2B:
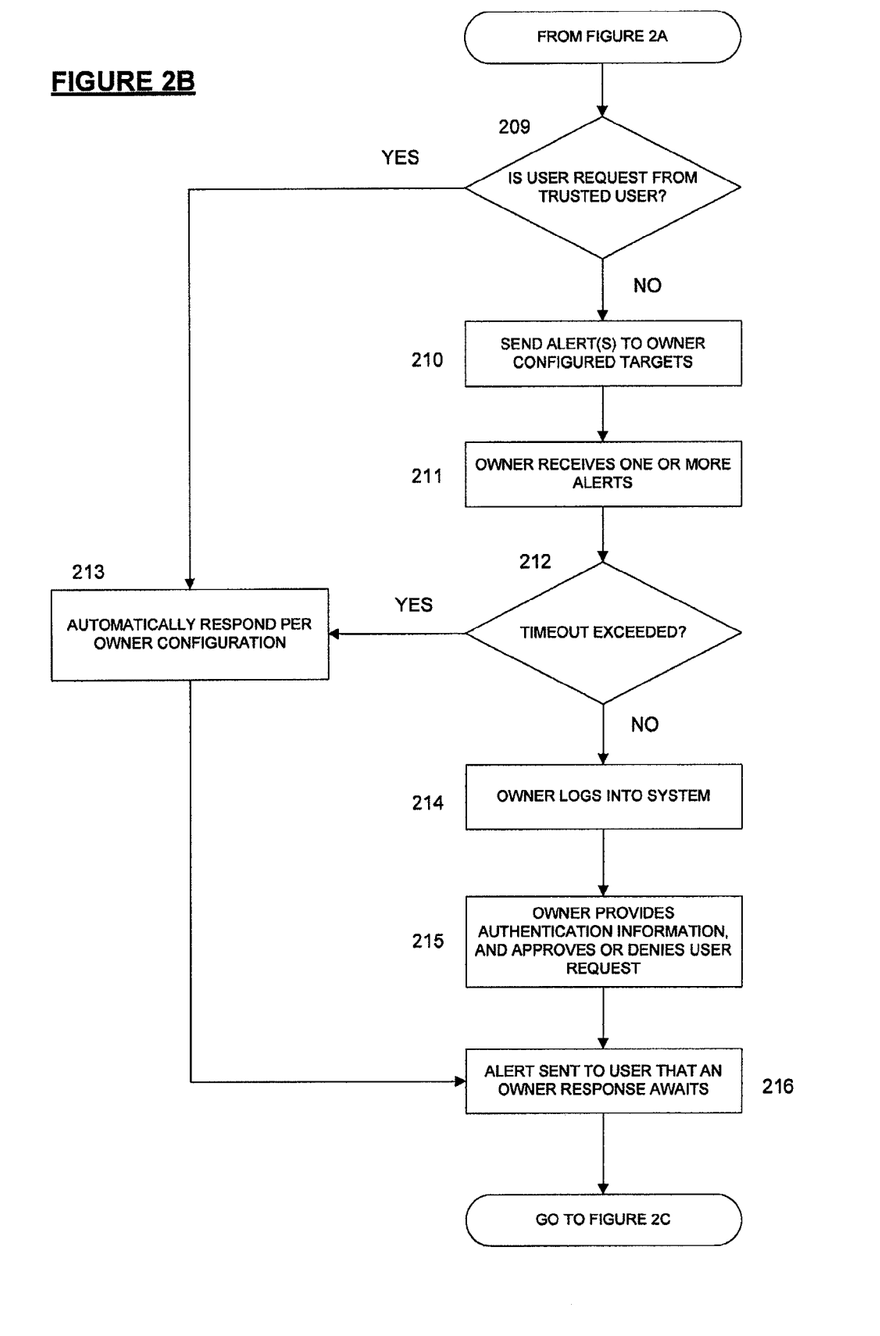
Figure 2C:
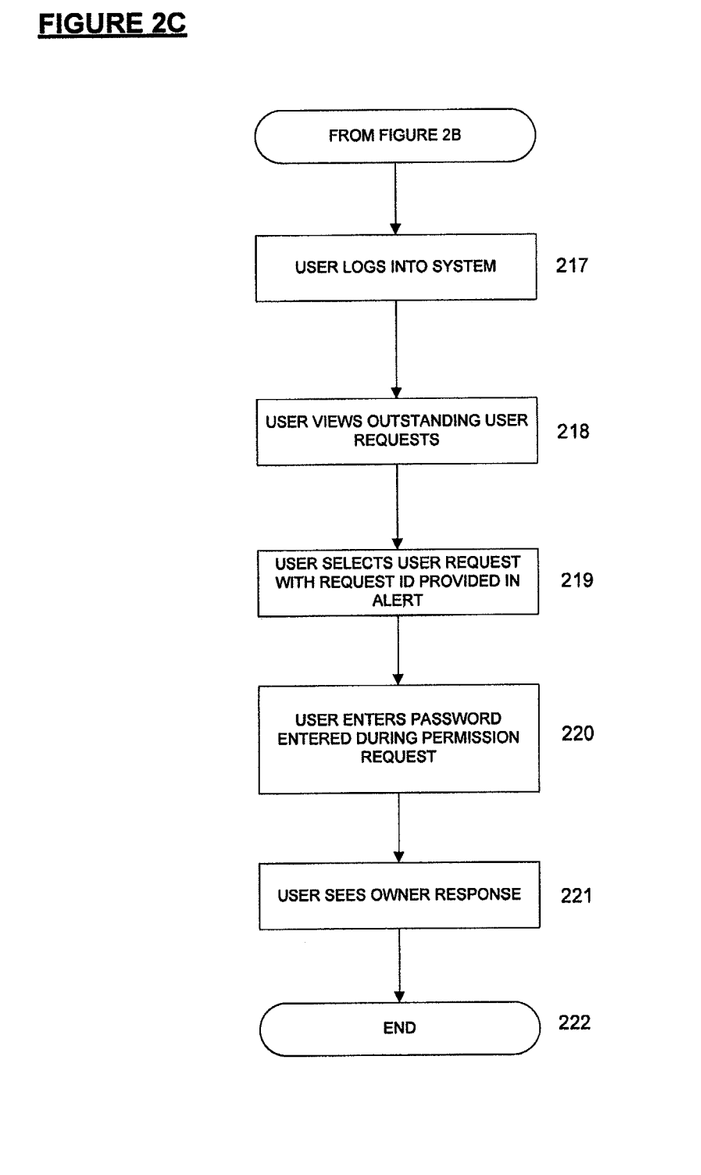

FIGS. 2A, 2B, and 2C provide a flowchart illustrating an exemplary embodiment of the permission-based access process. In FIG. 2A, at 203 the permission-based access process begins with a user logging into the permission-based access system. After logging into the system, at 204 the user selects a request permission option that enables the user to request permission to access a piece of sensitive personal information of an owner. Next, at 205, the user identifies the sensitive personal information (SPI) requested, the owner name associated with the sensitive personal information, and the request password.

At 206, the system uses the data entered by the user, a timestamp, and the request identifier to create a user request, by retrieving and verifying the user using the stored user profile at 202. Then, at 207, the system correlates the user request to an owner by referencing the source of truth.

The system references the owner profile 201 to determine at 208 the next event in the process, dependent upon information provided in the owner profile 201.

In FIG. 2B, the process continues. In 209, the system determines if the user request is from a trusted user, based on the information provided in the owner profile 201. If the user request is from a trusted user, then the process proceeds to 213 wherein the system automatically responds based on the owner configuration stored in the owner profile 201. At 216, an alert notification is sent to the user that an owner response awaits the user.

However, if the user request is not from a trusted user, based on the information provided in the owner profile 201, then at 210 the system sends an alert notification to the owner configured targets based on the owner configuration stored in the owner profile 201. At 211, the owner receives the alert notification.

At 212, the system determines if a timeout has been reached. If the time limit for the owner to actively approve or disapprove the user request has been exceeded, then at 213 the system again automatically responds to the user request per the owner configuration stored in the owner profile 201. Accordingly, at 216 an alert notification is sent to the user that an owner response to the user request awaits.

However, at 212 if the time limit for the owner to actively approve or disapprove the user request has not been exceeded, then the owner still has time remaining in which to actively approve or disapprove the user request. Thus, at 214 the owner logs into the system, and at 215 the owner provides authentication information to authenticate that the owner is the owner associated with the specific owner information in the user request, and to either approve or deny the user request. After the owner has completed the approval or denial of the user request, at 216 the system sends an alert notification to the user informing the user that an owner response to the user requests awaits the user's attention.

In FIG. 2C, the user then logs into the system at 217. At 218, the user views the outstanding user requests that have been previously entered by the user, and at 219 the user selects the user request using the specific user request identifier provided to the user in the alert notification. At 220, the user then enters the user's password, which was previously entered during the permission request, at 221, the user then accesses the owner response to the user request.

Figure 3:
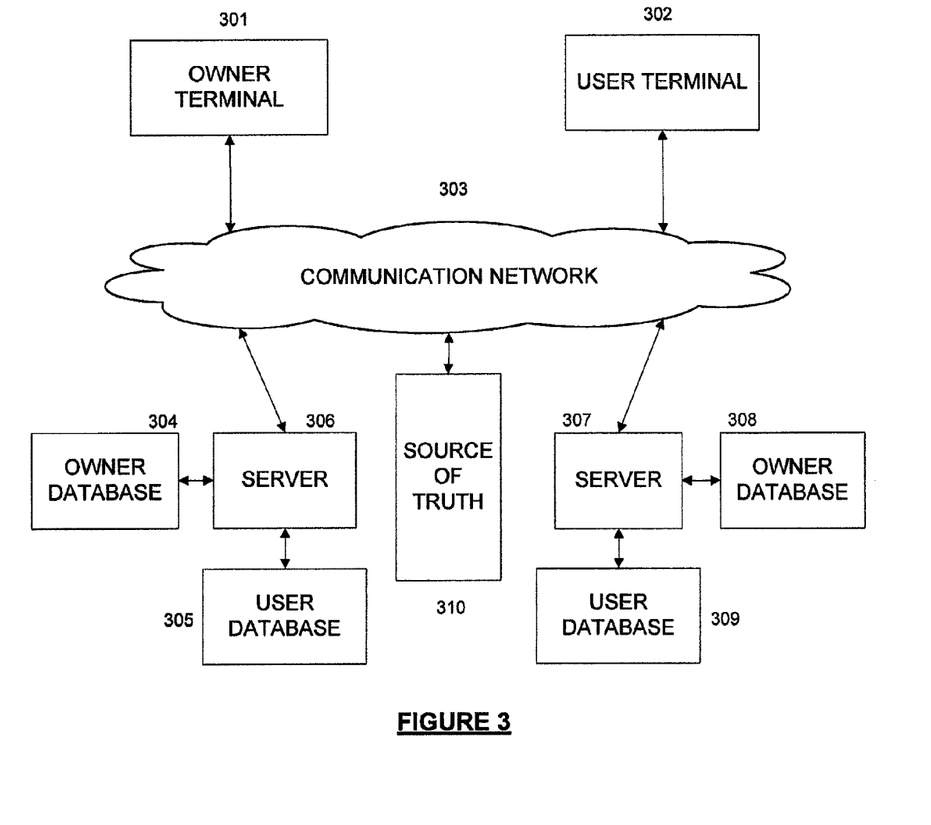
FIG. 3 shows an illustration of an exemplary embodiment of a permission-based access system.

FIG. 3 shows an illustration of an exemplary embodiment of a permission-based access system. In this embodiment, an electronic owner database 304 securely stores owner profiles, which have been entered into the system using owner terminal 301. Similarly, an electronic user database 305 securely stores user profiles, which have been entered into the system using user terminal 302. Server 306 receives user requests entered using the user terminal 302 requesting permission to access owner personal information. Server 306 also sends an alert notification to the owner using the owner terminal 301 that a user request for owner personal information has been received, and receives the owner's decision whether to approve or deny access the requested owner personal information. Server 306 also sends alert notifications to the user using the user terminal 302 when server 306 receives the owner's decision. Server 306 also sends automatic decisions to the user in response to the user request under certain circumstances, dependent upon the information stored in the owner profile in the owner database 304. FIG. 3 also includes another server 307, owner database 308, and user database 309, to show that plurality of servers, owner databases, and user databases may be included in the system. FIG. 3 further includes source of truth 310. Again, a plurality of sources of truth may be included in the system.

Although the invention has been described with reference to several exemplary embodiments, it is understood that the words that have been used are words of description and illustration, rather than words of limitation. Changes may be made within the purview of the appended claims, as presently stated and as amended, without departing from the scope and spirit of the invention in its aspects. Although the invention has been described with reference to particular means, materials and embodiments, the invention is not intended to be limited to the particulars disclosed; rather the invention extends to all functionally equivalent structures, methods, and uses such as are within the scope of the appended claims.

For example, the permission-based personal information access method may be implemented using various forms of communication including telephone land lines, cell phones, voice over Internet protocol, and video calls.

While the computer-readable medium is shown to be a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the methods or operations disclosed herein.

In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device to capture carrier wave signals such as a signal communicated over a transmission medium. Accordingly, the disclosure is considered to include any computer-readable medium or other equivalents and successor media, in which data or instructions may be stored.

Although the present specification describes components and functions that may be implemented in particular embodiments with reference to particular standards and protocols, the disclosure is not limited to such standards and protocols. For example, standards for Internet and other packet switched network transmission (e.g., VoIP, VoiceXML, SALT, SRGS, SISR, SSML, PLS, CCXML) represent examples of the state of the art. Such standards are periodically superseded by faster or more efficient equivalents having essentially the same functions. Accordingly, replacement standards and protocols having the same or similar functions are considered equivalents thereof.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract of the Disclosure is provided to comply with 37 C.F.R. §1.72(b) and is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

The above disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description.

What is claimed is:

1. A method for providing permission-based access to personal information over a communication network, the method comprising:
    entering specified owner personal information in an owner terminal, by an owner, to establish a secure owner profile;
    storing the secure owner profile in a secure owner database;
    entering specified user personal information in a user terminal, by a user, to establish a secure user profile;
    storing the secure user profile in a secure user database, which is separate from the secure owner database;
    entering a user request in the user terminal requesting permission to use a designated piece of the owner personal information from the secure owner profile stored in the secure owner database;
    accessing a source of truth, which maps an identification of the requested designated piece of owner personal information with a system ID and a profile ID of the owner, by a server in order to obtain the system ID and the profile ID of the owner;
    determining, by the server, whether the user has been designated as a trusted user by the owner, wherein the server automatically determines whether to approve the user request based on the secure owner profile when the user request is determined to be from a trusted user, and wherein the server sends an alert notification to the owner and awaits an owner response providing an owner approval determination when the user request is determined to be from a non-trusted user;
    providing permission to use the designated piece of the owner personal information to the user over the communication network after the user request is approved; and
    using the received system ID and the profile ID of the owner from the server, the user accesses the designated piece of the owner personal information that is stored in the secure owner profile in the secure owner database.

2. The method as described in claim 1,
    wherein the secure owner profile includes the owner's name, owner profile identifier, sensitive personal information, a list of trusted users, and an alert configuration.

3. The method as described in claim 2,
    wherein the list of trusted users includes a global list of trusted users whose user requests are automatically approved, and a specific list of trusted users whose user requests are approved only for selected pieces of the owner's personal information, designated by the owner.

4. The method as described in claim 1,
    wherein the owner can update the specified owner personal information stored in the secure owner profile over the communication network using the user terminal.

5. The method as described in claim 1,
    wherein the secure user profile includes the user's name and user profile identifier.

6. The method as described in claim 1,
wherein all user requests and related approval determinations are stored in an historical database establishing an historical record.

7. The method as described in claim 1,
wherein the user request includes a piece of owner personal information that is used by the server to determine whether to approve the user request, such that the server provides (1) a response indicating that the owner is not a subscriber when the piece of owner personal information does not match any owner stored in any owner database, (2) a response automatically approving the user request when the user is included in a global list of trusted users, and (3) a response conditionally approving the user request when the user is included in a specific list of trusted users, dependent upon the user and the designated portion of owner personal information requested.

8. The method as described in claim 1,
wherein the alert notification includes specific information designated by the owner in the secure owner profile.

9. The method as described in claim 8,
wherein the server waits a designated amount of time for the owner response to the alert notification, the designated amount of time being specified in the secure owner profile, and the server provides an owner default response to the user request when the owner response is not received within the designated amount of time.

10. The method as described in claim 1,
wherein the owner may access all pending user requests, and selectively determine whether to approve each pending request.

11. The method as described in claim 10,
wherein the owner must enter both a permanent owner identifier and a transitory security identifier to access the pending user requests.

12. The method as described in claim 1,
wherein when the owner selects a special lockdown provision, the server continues to receive user requests from a designated user, but is prevented from approving any user requests from the designated user, and when the owner selects a global lockdown provision, the server continues to receive user requests from all users, but is prevented from approving user requests from any user.

13. The method as described in claim 1,
wherein the processor provides a special warning message to the owner when at least one designated user request attribute exceeds an owner-established user request threshold.

14. The method as described in claim 13,
wherein the at least one designated user request attribute exceeds a total number of user requests within a timeframe established by the owner.

15. The method as described in claim 14,
wherein the at least one designated user request attribute further exceeds a total number of user requests for a same piece designated portion of owner personal information.

16. The method describe in claim 1,
wherein the user may query the personal data access system using the user terminal to check the status of user requests.

17. A non-transitory tangible computer-readable storage medium encoded with an executable computer program for providing permission-based access to personal information, which when executed by a processor, causes the processor to perform operations comprising:

entering specified owner personal information in an owner terminal, by an owner, to establish a secure owner profile;

storing the secure owner profile in a secure owner database;

entering specified user personal information in a user terminal, by a user, to establish a secure user profile;

storing the secure user profile in a secure user database, which is separate from the secure owner database;

entering a user request in the user terminal requesting permission to receive a designated piece of the owner personal information from the secure owner profile stored in the secure owner database;

accessing a source of truth, which maps an identification of the requested designated piece of owner personal information with a system ID and a profile ID of the owner, by a server in order to obtain the system ID and the profile ID of the owner;

determining, by the server, whether the user has been designated as a trusted user by the owner, wherein the server automatically determines whether to approve the user request based on the secure owner profile when the user request is determined to be from a trusted user, and wherein the server sends an alert notification to the owner and awaits an owner response providing an owner approval determination when the user request is determined to be from a non-trusted user;

providing access to the designated piece of the owner personal information to the user over the communication network after the user request is approved; and using the received system ID and the profile ID of the owner from the server, the user accesses the designated piece of the owner personal information that is stored in the secure owner profile in the secure owner database.

18. A system for providing permission-based access to personal information over a communication network, comprising:

a secure electronic owner database that stores at least one secure owner profile, the at least one secure owner profile including specified owner personal information, which was entered into the system by an owner terminal;

a secure electronic user database, which is separate from the secure electronic owner database, that stores at least one secure user profile, the at least one secure user profile including specified user personal information, which was entered into the system by a user terminal;

a server, including a central processing unit, that receives at least one user request entered into the system by the user terminal, the at least one user request requesting permission to use a designated piece of owner personal information from the secure owner profile stored in the secure electronic owner database; and a source of truth, which maps an identification of the requested designated piece of owner personal information with a system ID and a profile ID of the owner, that is accessed by the server in order to obtain the system ID and the profile ID of the owner, wherein the server determines whether the user has been designated as a trusted user by the owner, wherein the server automatically determines whether to approve the user request based on the secure owner profile when the user request is determined to be from a trusted user, and wherein the server sends an alert notification to the owner and awaits an owner response providing an owner approval determination when the user request is determined to be from a non-trusted user wherein the server provides access to the designated piece of the owner personal information to the user over the communication network after the user request has been approved, and wherein the received system ID and the profile ID of the owner from the server are used by the user to access the designated piece of the owner personal information that is stored in the secure owner profile in the secure owner database.

\* \* \* \* \*